June 3, 1969  R. M. COLLINS  3,447,570

PUNCTURE PAD AND HOLDER

Filed Nov. 1, 1967

INVENTOR
ROBERT M. COLLINS
BY
MAHONEY & HORNBAKER
ATTORNEY

United States Patent Office 3,447,570
Patented June 3, 1969

3,447,570
PUNCTURE PAD AND HOLDER
Robert M. Collins, 14225 Foothill Road,
Golden, Colo. 80401
Filed Nov. 1, 1967, Ser. No. 679,799
Int. Cl. F16l 55/00, 9/14; B67b 7/24
U.S. Cl. 138—103                    5 Claims

ABSTRACT OF THE DISCLOSURE

A means for connecting a hollow needle with the interior of a penetrable tube. The means comprises a penetrable, self-sealing member or puncture pad located on the outer top surface of the tube to form a fluid tight seal therewith. The means also comprises an impenetrable element or holder located adjacent to the opposite outer bottom surface of the tube.

BACKGROUND OF THE INVENTION

The subject matter of this invention is an extra-corporeal blood sampling and medicine injecting device which is used, among other things, to inject heparin or protamine into the arterial or venous lines of an artificial kidney machine.

In the prior art, the manufacturer of the tubing sets installed self-sealing latex sleeves on the plastic lines or tubes. This was a tedious, time-consuming job requiring hand labor to wet the tubes, to expand the sleeves and then to slip them over the wet ends of the tubes. Obviously, the sleeves could not be installed after the connections were attached to the ends of the tubes. Also, it was extremely difficult to move the sleeves to a position more than two or three feet from the ends of the tubes. In addition, there was always a time lag between the installation of the sleeve and the use of the tubing. This delay resulted in cold flow of the plastic tube away from the tight latex sleeve. As a result, the ends of the sleeve had to be tied immediately before use, as shown in FIGS. 1 and 2, to prevent leakage between the sleeve and tube. This process required plastic ties, wires or sutures and an expensive gun, such as shown and described in J. E. Caveney et al. U.S. Letters Patent No. 3,169,560, or other tying tool. Furthermore, the bottom of the sleeve was held in the palm of one hand while the other forced the needle through the top of the sleeve and tube. Sometimes, the needle accidentally penetrated the bottom of the tube and sleeve and injured the user.

Thus, the prior art had these disadvantages: it required tedious, time-consuming installation of the sleeves; the installations had to be completed prior to the attachment of the connections to the ends of the tubes; extra materials were required, such as ties, wires or sutures, as well as an expensive tying tool; and there was always danger of injury to the user.

OBJECTS AND SUMMARY OF THE INVENTION

It is therefore an object of my invention to eliminate the aforementioned tedious, time-consuming steps in installing a latex sleeve, and to permit installation of a blood sampling device after connections are attached to the ends of the tubes, by providing instead of the sleeve a penetrable, self-closing member or puncture pad located on the upper surface of the tube.

It is also an object of my invention to facilitate the positioning of this penetrable, self-closing member by providing an element or holder for securing said member tightly against the tube.

It is a further object of my invention to eliminate cold flow by adhesively or otherwise joining the penetrable self-closing member to the tube.

It is a still further object of my invention to eliminate the danger of injury to the user by making the aforementioned element or holder impenetrable and positioning it on the bottom surface of the tube opposite the penetrable self-closing member.

Other objects and advantages of the invention will be apparent from the following specification and the accompanying drawings, which are for the purpose of illustration only.

DESCRIPTION AND BEST MODE CONTEMPLATED

Figure 1:
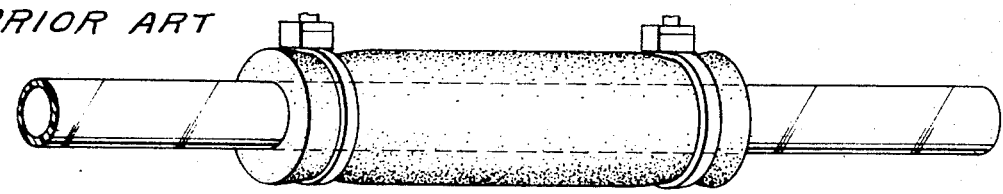
FIG. 1 is a perspective view of a latex sleeve on a plastic tube in accordance with the prior art.
Figure 2:
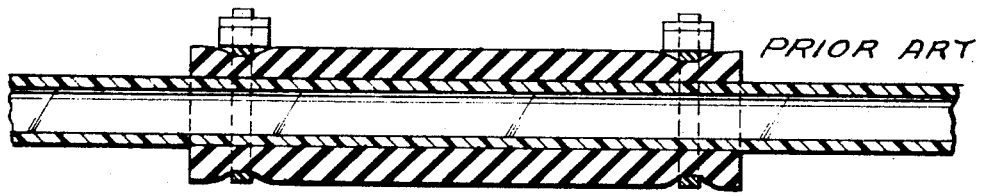
FIG. 2 is a cross-sectional view of FIG. 1.
Figure 4:
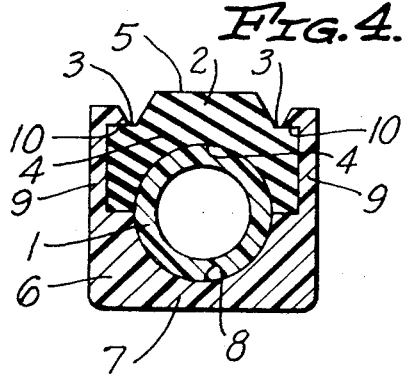
FIG. 4 is a cross-sectional view along the lines 4—4 of FIG. 3.
Figure 3:
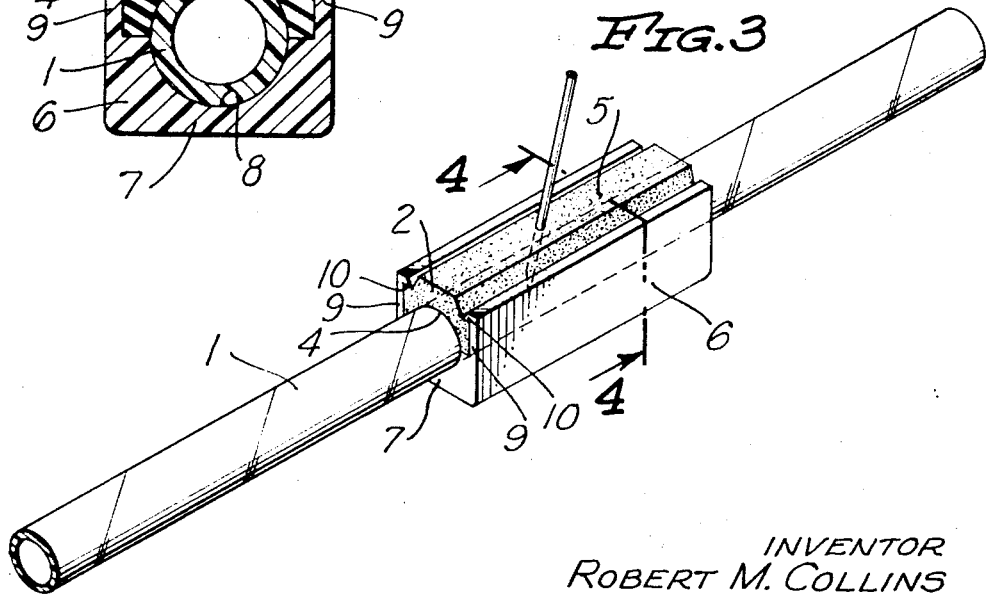
FIG. 3 is a perspective view of the elements of my invention.

In FIGS. 3 and 4, I show a penetrable, hollow plastic tube 1 having a smooth inner surface to eliminate turbulence in the fluid flow therein. Since my invention is especially applicable to artificial kidney machines in which the tubes carry the patient's circulating blood to and from a dialyzer, it is extremely important to provide a low resistance, laminar flow. The reason: any turbulence may destroy red blood cells and facilitates fibrin formation or clotting which can seriously affect the patient.

In FIGS. 3 and 4, I also show a penetrable, self-closing U-shaped member 2 having a pair of upper surface edges 3 and a concave, cylindrical lower surface 4 joined to the outer, top surface of the tube to form a fluid-tight seal. The upper surface of the member 2 may be formed with a flat, raised portion 5 to provide a needle receiving area. If the upper surface is wet, this area facilitates insertion of the needle and avoids injury to the user.

To hold the penetrable, self-closing member tightly against the tube, and also to protect the user, I provide an impenetrable element or holder 6 comprising a base 7 having an upper, concave cylindrical surface 8 joined to the outer, bottom surface of the tube. The element 6 also comprises a pair of arms 9 extending upward from the base along the sides of the tube, each of the arms having an inwardly extending detent 10 engaging the upper surface edges 3 of the penetrable, self-closing member 5.

I have found that medical grade Shell Chemical Phaos 103 or 109 or medical grade silicone rubber or latex is a suitable material for the penetrable, self-closing member and ABS styrene or rigid vinyl is a suitable material for the impenetrable element.

Satisfactory dimensions for the self-closing member and the impenetrable element may vary slightly, but they can be easily determined by a person skilled in the art. Preferably, they should provide a snug fit around the tube.

While I have described the penetrable, self-closing member and impenetrable element as joined to the tube, this is not essential. The penetrable, self-closing member may merely be located on the tube and the impenetrable element may be located on or adjacent to the tube. Also, while I have described the impenetrable element as having an upper, concave cylindrical surface, it would be obvious to a person skilled in the art to use other configurations, especially if the element is not joined to the tube. And if the penetrable self-closing member and impenetrable element are joined to the tube, the arms on the latter are likewise not essential, although they ordinarily hold the penetrable, self-closing member in position while it is being joined to the tube.

In installing my invention, I first apply an adhesive to the concave, cylindrical upper surface of the base 7 of the impenetrable element 6. Then, I position the element on the tube with the adhesive-coated surface in contact with the bottom, outer surface of the tube. Next, I apply an adhesive to the concave, cylindrical lower surface of the penetrable, self-closing member. After that, I position the member on the tube with the adhesive-coated surface in contact with the upper outer surface of the tube. Finally, I lock the member in position by forcing the inwardly extending detents on the arms of the impenetrable element into engagement with the upper surface edges of the penetrable self-closing member. The adhesive then dries to join the penetrable, self-closing member and impenetrable element to the tube.

Obviously, these steps may be interchanged or reversed or performed simultaneously, or some may be omitted, without departing from my invention. For example, the application of an adhesive to the upper surface of the impenetrable element may be omitted. And the adhesive may be applied to the outer, top surface of the tube instead of to the concave, cylindrical lower surface of the penetrable self-closing member. Also, heat sealing or sonic welding may be substituted for the application of adhesives.

Since the foregoing description is addressed to a person skilled in the art, I have omitted certain descriptive matter and specific references to all of the variations and modifications of my invention which would be obvious to such a person.

Also, certain terms have been used for brevity, clearness and understanding, but no unnecessary limitations are to be implied therefrom because such words are used for descriptive purposes and intended to be broadly construed. In particular, the word "joined" as used herein is intended to include, among other things, "adhesively joined," "joined by heat sealing" and "joined by sonic welding." And the words "located on" mean, among other things, "tightly fitted on." Also, the word "penetrable" is intended to mean "penetrable by a hollow needle used in connection with medical syringes and the like."

Moreover, the embodiments, methods and products illustrated and described herein are examples only and the scope of the invention is not intended to be limited to the exact details of construction and methods shown. For example, I have used the terms "top," "bottom," "upper" and "lower" to describe the relative positions of the parts of my invention without the intention of excluding other similar relative positions, such as would result from turning my invention on its side.

I claim as my invention the devices and methods defined in the following claims and all equivalents thereof.

1. In combination,
  a penetrable, continuous, hollow tube having an outer, top surface, an outer bottom surface, and a smooth inner surface to eliminate turbulence in the fluid flow therein,
  a penetrable, self-closing U-shaped member having a concave, cylindrical lower surface, said lower surface being located on and joined to the outer, top surface of a continuous portion of the tube to form a fluid tight seal, and
  an impenetrable U-shaped element located on the outer, bottom surface of the tube with at least a part of the impenetrable element opposite at least a part of the penetrable self-closing member.

2. In combination,
  a penetrable, hollow tube having an outer, top surface, an outer bottom surface, and a smooth inner surface to eliminate turbulence in the fluid flow therein,
  a penetrable, self-closing member having a pair of upper surface edges and a concave, cylindrical lower surface, said lower surface being located on the outer, top surface of the tube to form a fluid tight seal, and
  an impenetrable member comprising a base having an upper concave, cylindrical surface located adjacent to the outer bottom surface of the tube and a pair of arms extending upward from the base along the sides of the tube, each of said arms having an inwardly extending detent engaging an upper surface edge of the penetrable self-closing member to tightly lock the tube between the element and member.

3. In combination, a penetrable, hollow tube having an outer, top surface, an outer bottom surface, and a smooth inner surface to eliminate turbulence in fluid flow therein,
  a penetrable, self-closing member having a pair of upper surface edges and a concave, cylindrical lower surface, said lower surface being joined to the outer, top surface of the tube to form a fluid tight seal, and
  an impenetrable element comprising a base having an upper concave, cylindrical surface located adjacent to the outer bottom surface of the tube with at least a part of the impenetrable element opposite at least a part of the penetrable self-closing member and a pair of arms extending upward from the base along the sides of the tube, each of said arms having an inwardly extending detent engaging an upper surface edge of the penetrable self-closing member to tightly lock the tube between the element and member.

4. The combination of claim 3 in which the penetrable, self-closing member comprises an upper surface having a flat, raised portion.

5. The combination of claim 3 in which the upper concave, cylindrical surface of the base of the impenetrable element is joined to the outer bottom surface of the tube.

References Cited

UNITED STATES PATENTS

| | | | |
|---|---|---|---|
| 256,060 | 4/1882 | Seagraves et al. | 138—157 |
| 388,260 | 8/1888 | Carey | 138—161 |
| 2,346,334 | 4/1944 | Shaw | 128—214 |
| 2,402,781 | 6/1946 | Schreiber | 138—157 |
| 2,832,338 | 4/1958 | Ryan | 128—214 |
| 3,055,399 | 9/1962 | Bush et al. | 138—157 |
| 3,223,125 | 12/1965 | Melander | 138—157 |
| 3,327,709 | 6/1967 | Nehring et al. | 128—214 |

LAVERNE D. GEIGER, *Primary Examiner.*

U.S. Cl. X.R.

128—214; 138—147, 151; 222—88